C. RUHE.
MACHINE FOR TREATING LEATHER.
APPLICATION FILED JUNE 24, 1915.

1,154,341.

Patented Sept. 21, 1915.
6 SHEETS—SHEET 1.

Witnesses

Inventor
Carleton Ruhe,
By
Attorney

C. RUHE.
MACHINE FOR TREATING LEATHER.
APPLICATION FILED JUNE 24, 1915.

1,154,341.

Patented Sept. 21, 1915.
6 SHEETS—SHEET 4.

Witnesses

Inventor.
Carleton Ruhe,
By C. L. Parker. Attorney

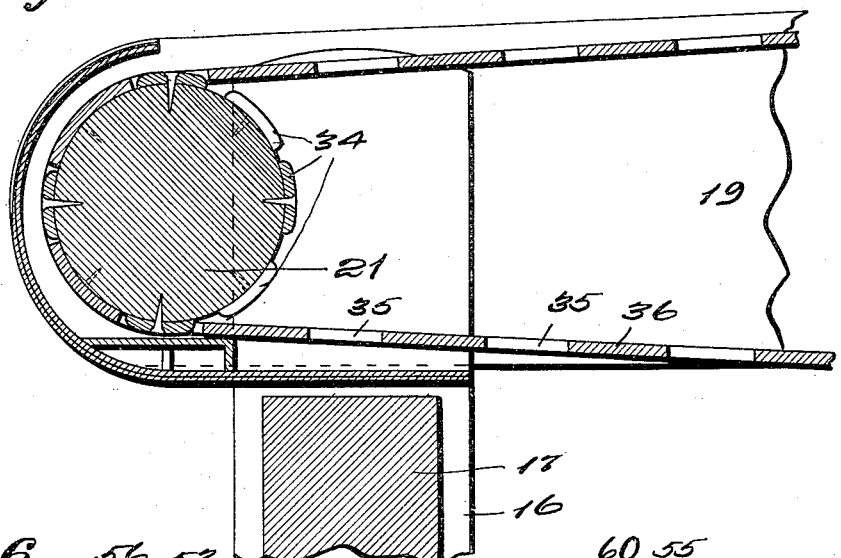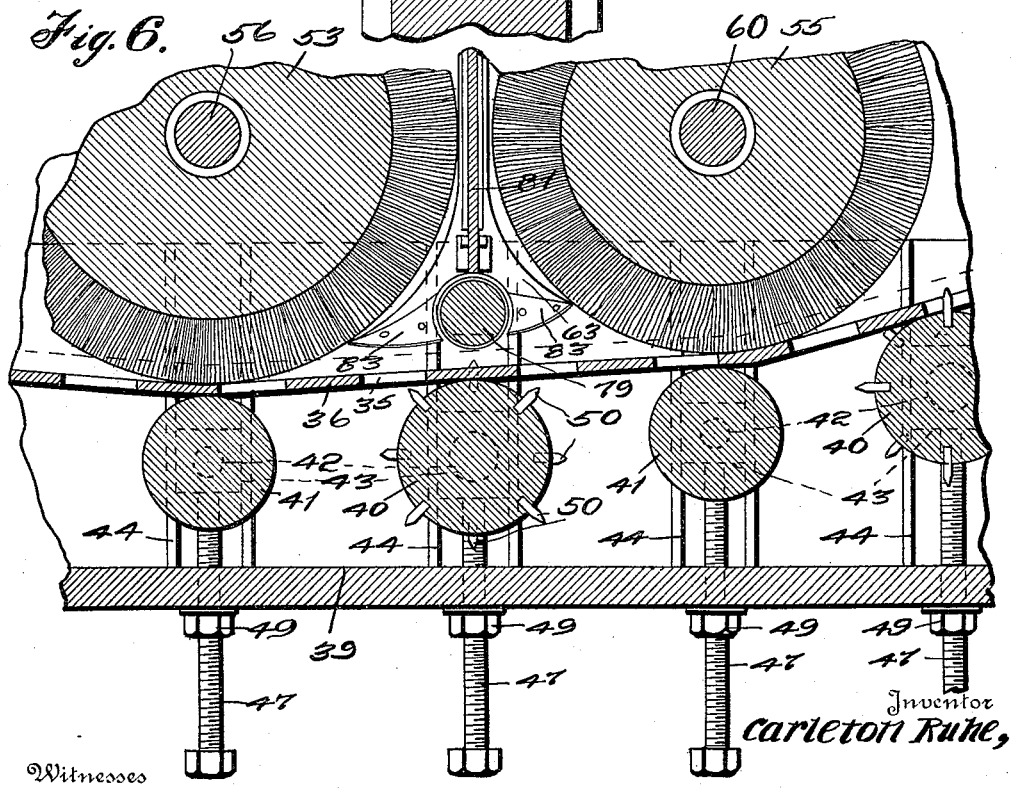

C. RUHE.
MACHINE FOR TREATING LEATHER.
APPLICATION FILED JUNE 24, 1915.
1,154,341.
Patented Sept. 21, 1915.
6 SHEETS—SHEET 6.
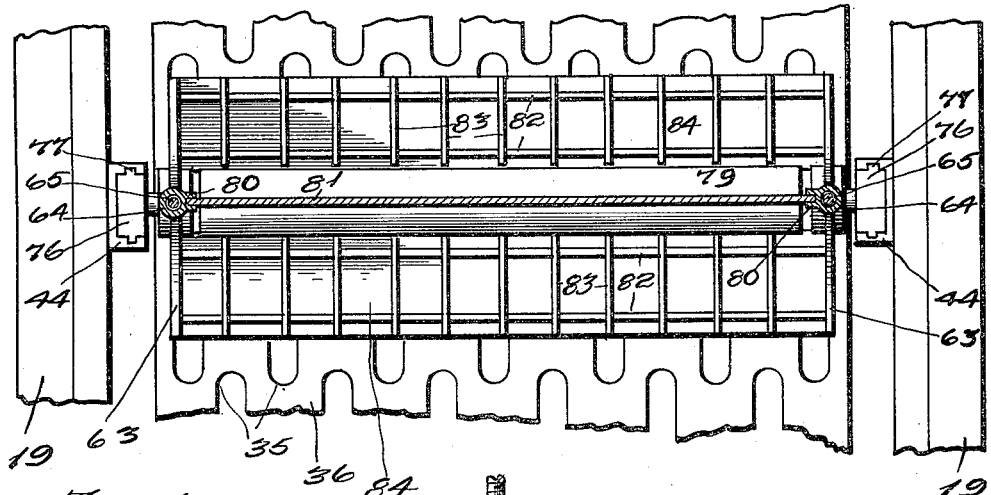
Fig. 7.
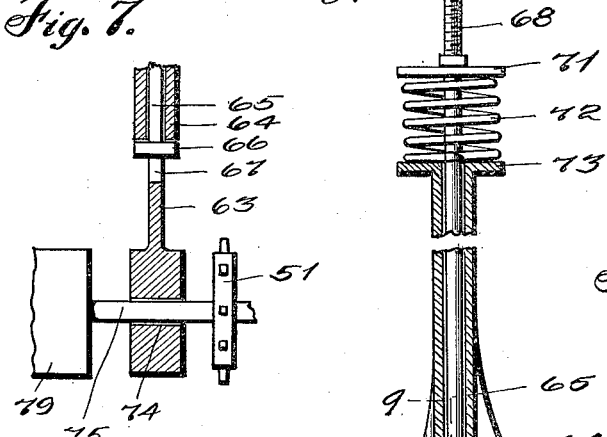
Fig. 8.
Fig. 9.
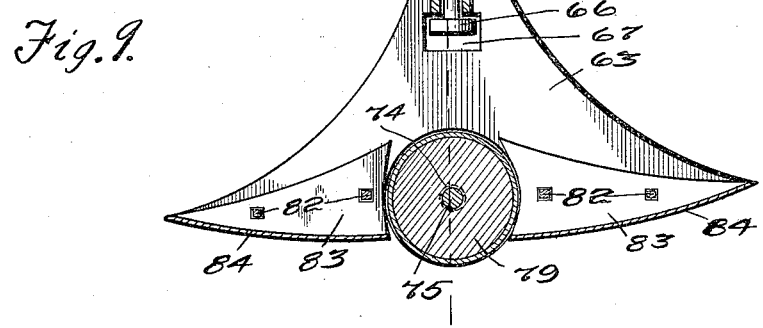
Inventor
Carleton Ruhe,
Witnesses
By C. L. Parker
Attorney

UNITED STATES PATENT OFFICE.

CARLETON RUHE, OF OLEAN, NEW YORK.

MACHINE FOR TREATING LEATHER.

1,154,341.  Specification of Letters Patent.  Patented Sept. 21, 1915.

Application filed June 24, 1915. Serial No. 36,045.

*To all whom it may concern:*

Be it known that I, CARLETON RUHE, a citizen of the United States, residing at Olean, in the county of Cattaraugus and State of New York, have invented certain new and useful Improvements in Machines for Treating Leather, of which the following is a specification.

My invention relates to machines for cleaning, washing or scrubbing leather, after the tanning thereof, while not necessarily restricted to such use, and has particular reference to improvements in such machines, shown and described in my pending application Serial No. 14,020, filed March 12, 1915.

An important object of the invention is to provide highly efficient means to prevent the leather or stock from slipping upon the traveling support or conveyer, without interfering with the passage of the leather beneath the brushes.

A further object of the invention is to provide means to prevent the leather, while passing beneath the movable or rotatable brushes from puckering and passing between the brushes.

A further object of the invention is to provide a machine of the above mentioned character, which is adjustable to operate upon leather or stock of different thicknesses.

A further object of the invention is to improve in general the construction of apparatus of this character, rendering the same more thorough and expeditious in operation, and convenient in use, without unduly complicating them.

Other objects and advantages of the invention will be apparent during the course of the following description.

Figure 1:
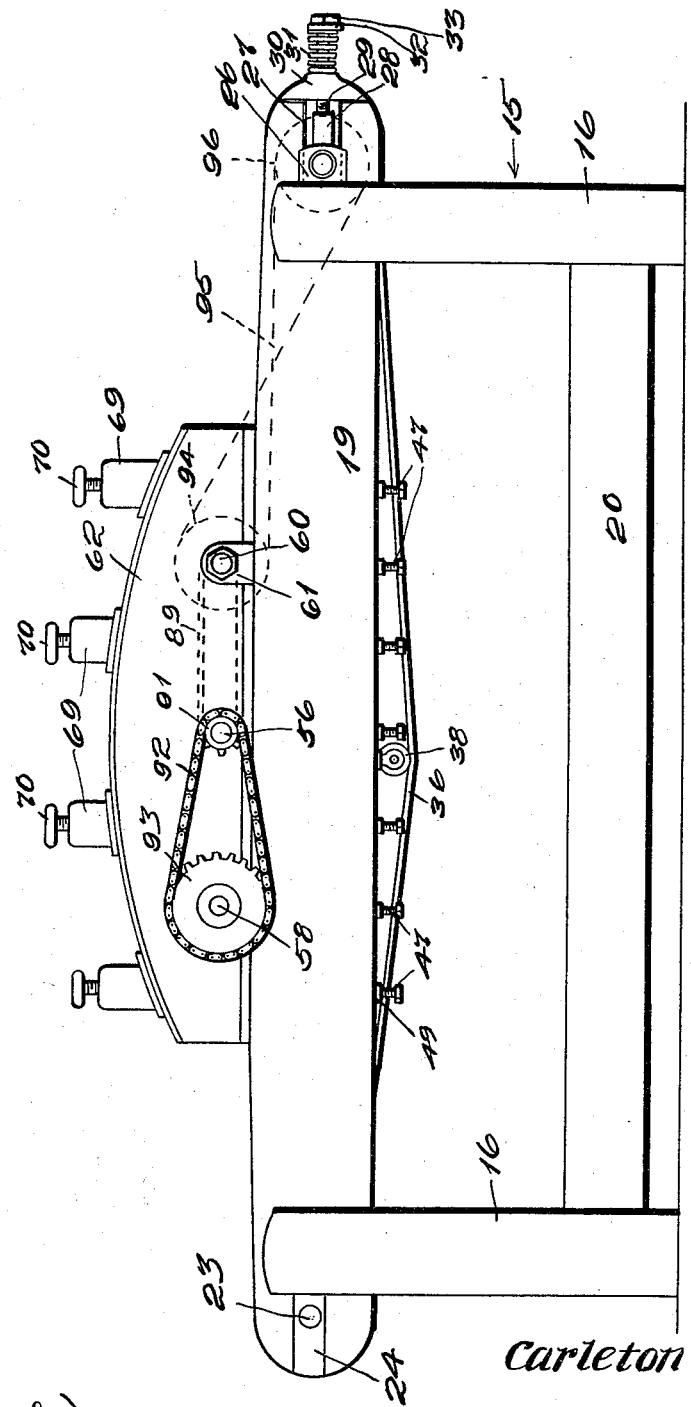
Figure 2:
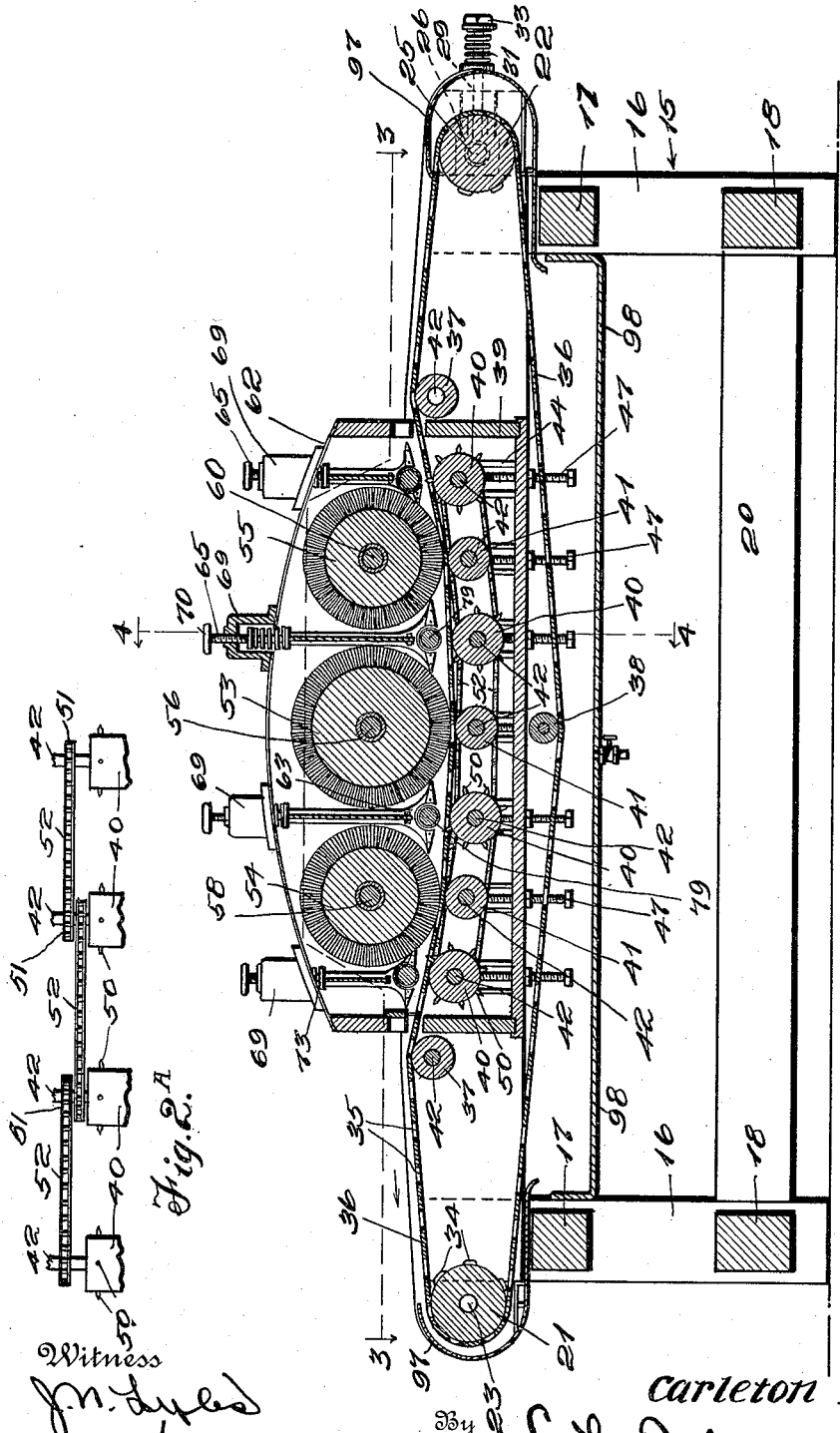
Figure 3:
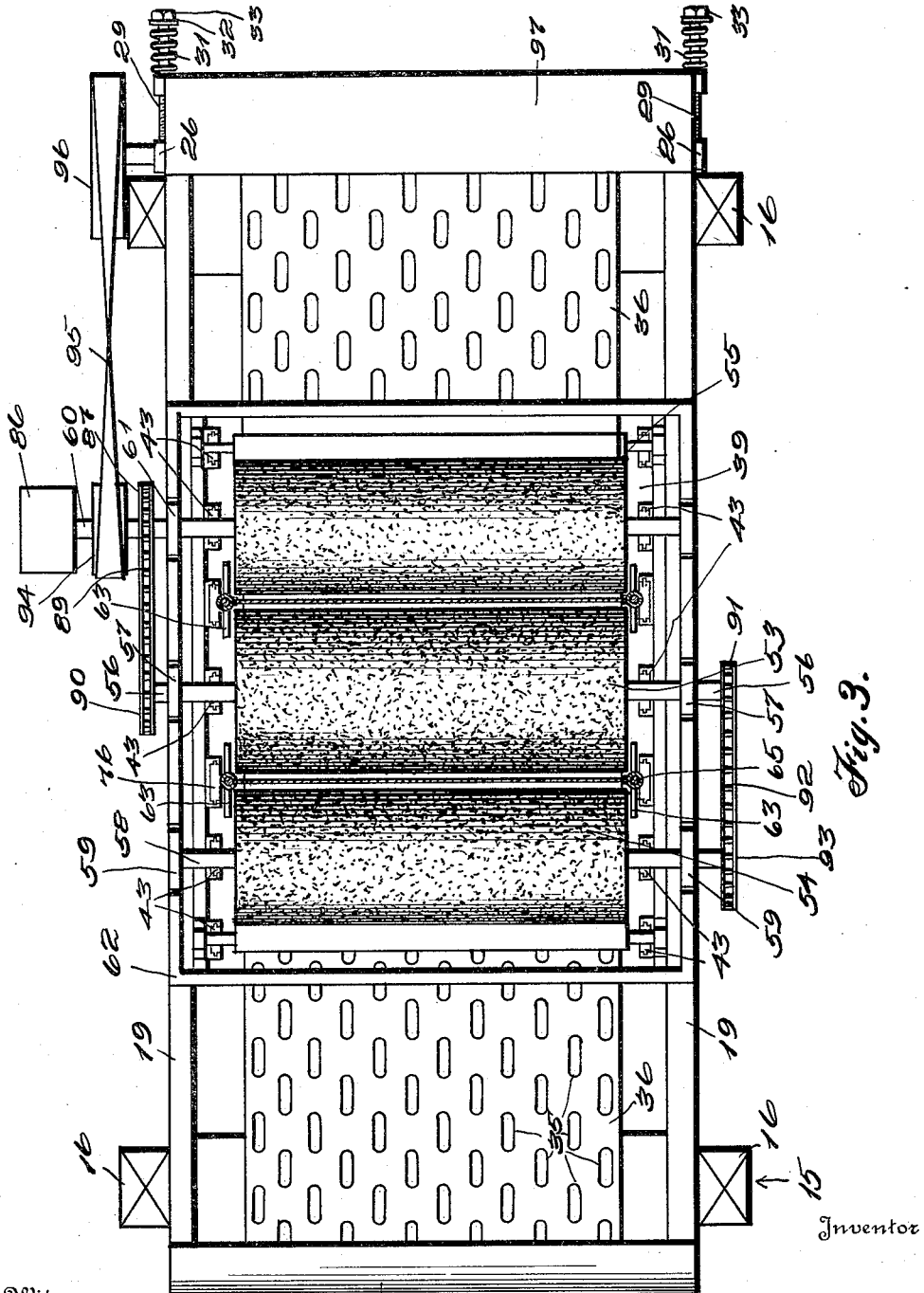
Figure 4:
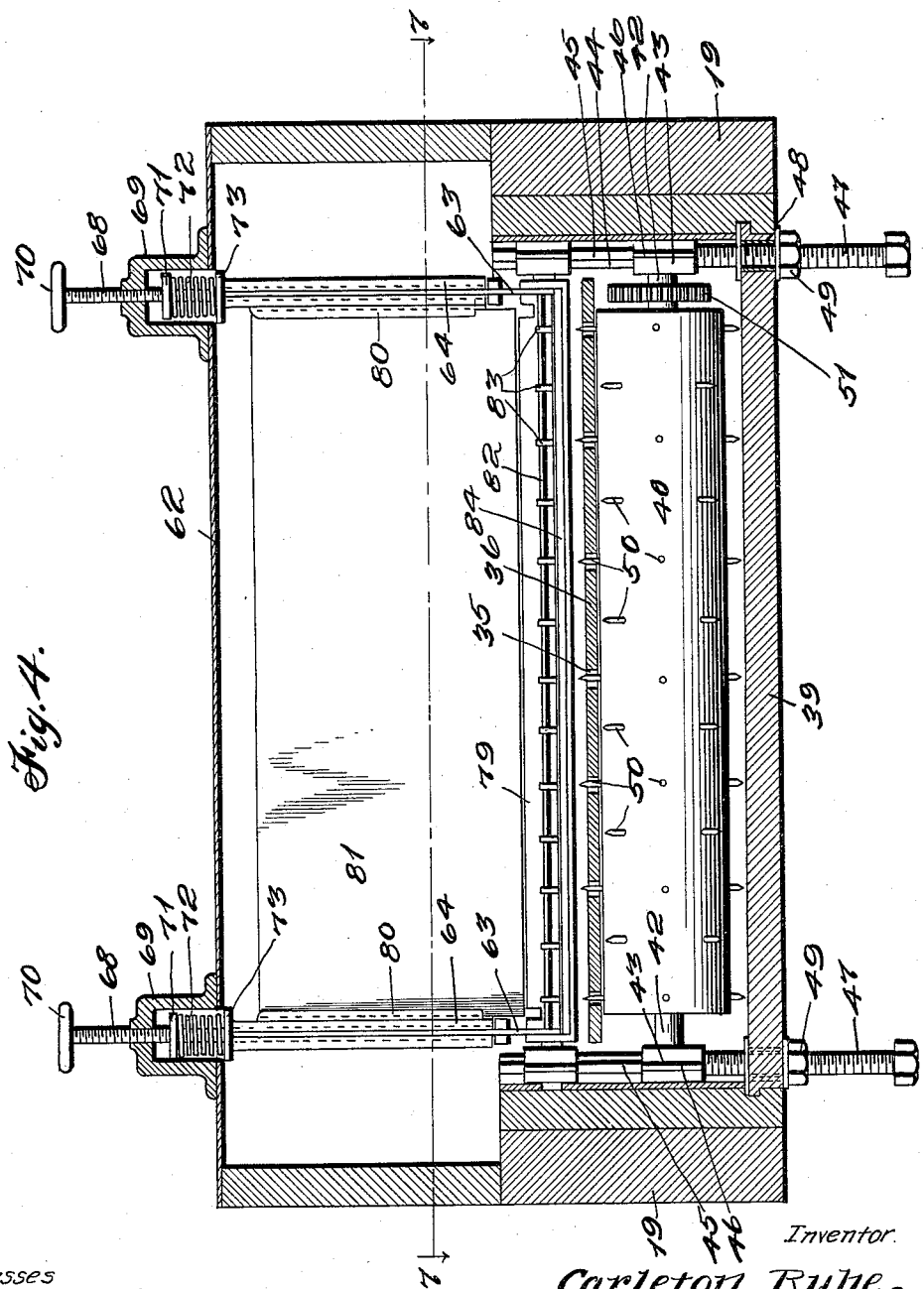

In the accompanying drawings forming a part of this specification and in which like numerals are employed to designate like parts throughout the same, Figure 1 is a side elevation of apparatus embodying my invention, Fig. 2 is a central vertical longitudinal sectional view through the same, Fig. 2ª is a plan view of gearing, connecting the prong carrying rolls, Fig. 3 is a horizontal plan view taken on line 3—3 of Fig. 2, Fig. 4 is a transverse sectional view taken on line 4—4 of Fig. 2, Fig. 5 is an enlarged detail section through the roller carrying the moving support or endless conveyer, Fig. 6 is an enlarged detail section through the endless conveyer and associated elements, Fig. 7 is a horizontal sectional view taken on line 7—7 of Fig. 4, Fig. 8 is a detail longitudinal sectional view through a sleeve embodied in adjustable guard means, associated elements being in elevation, and, Fig. 9 is a transverse sectional view taken on line 9—9 of Fig. 8.

In the drawings, wherein for the purpose of illustration is shown a preferred embodiment of my invention, the numeral 15 designates a supporting structure or frame as a whole, embodying vertical legs or posts 16, connected by transverse beams 17 and 18 and horizontal beams 19 and 20, as shown.

Arranged near the ends of the supporting structure 15 are rolls 21 and 22. The roll 21 is carried by a transverse shaft 23, journaled through bearings 24, carried by corresponding ends of the beams 19. These bearings 24 are preferably stationary. The roller 22 is carried by a transverse shaft 25, journaled through horizontally adjustable bearings 26, operating in elongated slots 27, formed in the opposite corresponding ends of the beams 19, as shown. The bearings 26 carry internally screw-threaded sleeves 28, preferably integral therewith, and screw-threaded rods or bolts 29 enter the sleeves. The bolts or rods 29 have their smooth portions operating through openings in caps 30 attached to the ends of the beams 19, as shown. Surrounding the outer ends of the bolts or rods 29 are compressible coil springs 31, engaging rings or washers 32, in turn engaging heads 33 of the bolts. It is thus apparent that the springs 31 tend to move the bearings 26 outwardly and the tension of these springs may be regulated by turning the bolts 29. The rolls 21 and 22 are provided upon their peripheries with teeth 34 (see Fig. 5) arranged in staggered order and adapted to enter elongated openings or slots 35 formed in a traveling support or endless conveyer 36, which is passed about these rollers. This conveyer may be formed of canvas, leather or the like. It is thus apparent that the springs 31 and associated elements tend to move the roll 22 outwardly for maintaining the endless conveyer under suitable tension, which may be regulated by adjusting the bolts 29.

The numeral 37 designates preferably plain supporting rolls journaled within the upper portion of the supporting frame, and contacting with the lower side of the upper portion of the endless conveyer, as shown. The lower portion of the endless conveyer, contacts with a guide or tension roll 38, preferably equidistantly spaced from its ends, and suitably rotatably connected with the supporting frame.

Arranged within the upper portion of the supporting frame is a trough 39 for holding water or any other liquid that it is desired to apply to the leather or stock. This trough has its upper side open and the upper portion of the endless conveyer passes through the upper open side of the trough beneath the level of the liquid in the trough while the lower portion of the endless conveyer passes beneath it.

Great difficulty has heretofore been experienced in holding the leather or stock in proper position upon the traveling support or endless conveyer, without injury thereto while it is being subjected to the action of highly rotating brushes, the leather or stock tending to slip and pucker or the like thereon. I provide means for preventing the slipping or displacement of the leather or stock upon the endless belt, comprising sets of rolls 40 and 41. Each of these rolls is rigidly mounted upon a transverse shaft 42, journaled through vertically adjustable bearings 43, as more clearly shown in Fig. 4. These bearings operate in suitable vertical guides or tracks 44, having grooves 45, to receive tongues 46, carried by the bearings. Having swiveled connection with each bearing 43 is an adjusting bolt 47, screw-threaded through a sleeve 48, extending through the bottom of the trough, there being a clamping nut 49 to lock the bolt 47 against improper movement. It is thus apparent that means are provided to raise and lower each roll 40 and 41, to move it toward and away from the lower surface of the upper portion of the endless conveyer. The set of rollers 40 are provided with comparatively short preferably pointed prongs or pins 50, which are arranged in staggered relation and are adapted to move into and out of the elongated openings 35 of the endless conveyer 36. The set of rolls 41 which are disposed between the rolls 40 and preferably directly beneath brushes to be described, have no pointed prongs or pins and are preferably smooth. In order that the prong carrying rolls 40 may rotate together so that their points will properly enter the openings in the endless conveyer, the shafts 42 carrying them have sprocket wheels 51 (see Fig. 2ª) rigidly secured thereto, which engage sprocket chains 52, as shown. The plain rolls 41 are not shown as geared for rotation with the prong carrying rolls, as this is not necessary, while it is to be understood that such a construction could be employed if desired.

Arranged above the endless conveyer 36, and extending across the open top of the trough 39 is an inner rotatable brush 53, and outer rotatable brushes 54 and 55. The inner brush 53 is rigidly mounted upon a transverse shaft 56, journaled through bearings 57, rigidly secured to the beams 19. The brush 54 is rigidly mounted upon a transverse shaft 58, journaled through bearings 59, rigidly secured to the beams 19. The brush 55 is rigidly mounted upon a transverse shaft 60, journaled through bearings 61, rigidly connected with the beams 19. The means for rotating these brushes will be described hereinafter.

The numeral 62 designates a hood or cover for normally inclosing the rotatable brushes and having openings through which the bearings of the brush shafts project, as shown. This cover may be rigidly secured to the supporting frame by any suitable means.

Means are provided for preventing the leather or stock carried by the upper portion of the endless conveyer from moving upwardly between the brushes when passing beneath them. Such means comprises vertically adjustable carriages 63 (see more particularly Figs. 7 and 8). These carriages have connection with vertical tubes 64, which are preferably formed integral therewith. As more clearly shown in Fig. 8, each tube 64 receives an adjusting rod 65 therein, provided at its lower end with an enlarged head 66, free to turn in an opening 67. The upper portion of the rod 65 is screw-threaded, as shown at 68 for screw-threaded engagement with a bonnet 69, rigidly attached to the hood or cover. The rod 65 is turned by a hand wheel 70 or the like. The numeral 71 designates a disk or plate which is rigidly secured to the rod 65, and arranged within the bonnet 69. This plate contacts with the upper end of a suitably stiff compressible coil spring 72, contacting with a flange 73, formed upon the upper end of the tube 64. It is thus apparent that by rotating the hand wheel 70 the carriage 63 may be raised and lowered, and the spring 72 will permit of an upward yielding movement of the carriage, when desired. The carriages are apertured as shown in Fig. 9, for rotatably receiving shafts 75, the outer ends of which are journaled through bearings 76, having tongues 77, operating in the grooves 45. The bearings 76 are vertically movable. The shafts 75 carry smooth rollers 79.

The tubes 64 are provided upon their inner sides with spaced flanges 80, which receive and hold relatively stationary partitions 81, disposed between the brushes, as shown. The function of these plates is to prevent the fiber or hair of the brushes contacting with each other, whereby the same will become entangled or damaged.

The carriages 63 in each pair are connected by transverse horizontal rods 82, which carry spaced supporting elements 83, to the lower side of which are attached plates or shoes 84, preferably formed of copper. It is obvious that the roller 79 and shoes 84 prevent the leather from passing upwardly between the brushes. The rollers 79 are arranged preferably above the prong carrying rolls and serve to hold the leather or stock against upward movement whereby the prongs properly contact therewith to prevent slipping of the leather.

The shaft 60 has a pulley 86 rigidly secured thereto, and the machine is preferably driven by power applied to this pulley. The shaft 60 also carries a sprocket wheel 87, rigidly mounted thereon, engaged by a sprocket chain 89, engaging a smaller sprocket wheel 90 rigidly mounted upon the shaft 56. Connected with the opposite ends of the shaft 56 is a small sprocket wheel 91 engaged by a sprocket chain 92, engaging a larger sprocket wheel 93, rotating the shaft 58. It is thus apparent that all of the brushes are rotated in the same direction, but the inner brush is rotated at a higher rate of speed. While this is the preferred means for rotating the brushes it is to be understood that the invention is not necessarily restricted to the means. Rigidly mounted upon the shaft 60 is a pulley 94, engaged by a crossed belt 95 engaging a pulley 96, fast upon the shaft 25. The pulley 94 is a great deal smaller than the pulley 96. The endless conveyer is therefore driven in the same direction with the brushes but at a much lower speed than each of them.

The ends of the endless belt are covered by liquid collecting members 97, held in place by any suitable means. The inner ends of these members discharge into a trough 98, arranged beneath the endless conveyer and suitably connected to the supporting structure.

The operation of the apparatus is as follows: The leather or stock to be treated, is placed upon the right hand end of the endless conveyer, and is carried thereby to the left beneath the rotatable brushes. While passing beneath these brushes the leather or stock contacts with the prongs or pointed members 50 carried by the rolls 40 and is prevented thereby from slipping, these rolls being continuously rotated by the pins passing in the openings 35. The trough contains a suitable liquid to be applied to the leather, such as water and the lower portion of the brushes rotate against the leather which is conducted beneath the level of the water or the like. The leather may be passed through the machine any number of times. It is to be understood that the water or the like may be applied to the stock by other suitable means.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a machine for treating leather, a supporting structure, a traveling support connected therewith and provided with openings, a movable member arranged beneath the traveling support and having prongs adapted to operate within the openings of the traveling support, and a movable brush arranged above the traveling support to contact with the leather or stock carried thereby.

2. In a machine for treating leather, a supporting structure, a traveling support connected therewith and provided with openings and adapted to receive thereon the leather or stock to be treated, a movable member provided with elements adapted to operate through the openings in the traveling support to contact with the leather or stock and hold it from moving with relation to the traveling support, a movable brush arranged near and above the traveling support to contact with the leather or stock thereon, means to drive the traveling support, and means to drive the movable brush.

3. In a machine for treating leather, a supporting structure, a traveling support to receive the leather or stock thereon, a movable member arranged near the traveling support and having prongs to contact with the stock for preventing it from slipping upon the traveling support, and a movable brush arranged near the traveling support to contact with the leather thereon.

4. In a machine for treating leather, a supporting structure, an endless conveyer connected therewith and provided with openings, a roll arranged beneath the upper portion of the endless conveyer and carrying prongs adapted to extend through and beyond the openings in the endless conveyer, and a rotatable brush arranged near and above the endless conveyer.

5. In a machine for treating leather, a supporting structure, a traveling support provided with openings and adapted to receive the leather thereon, a rotatable member arranged beneath the traveling support and having prongs adapted to extend through and beyond the openings of the traveling support, means to vertically adjust the rotatable member with relation to the traveling support, and a movable brush arranged near and above the traveling support.

6. In a machine for treating leather, a supporting structure, an endless conveyer connected therewith and provided with openings, a plurality of rolls disposed beneath the upper portion of the endless conveyer and having prongs adapted to extend through and beyond the openings in the endless conveyer, driving connecting means between the rolls whereby they turn together, and a movable brush arranged near and above the endless conveyer.

7. In a machine for treating leather, a supporting structure, rolls connected with the supporting structure and provided with teeth, an endless conveyer carried by the rolls and having openings to receive the teeth, a plurality of rotatable rolls arranged beneath the upper portion of the endless conveyer and carrying prongs adapted to extend through and beyond the openings to contact with the leather or stock carried thereon, and a rotatable brush arranged near and above the endless conveyer to contact with the leather or stock thereon.

8. In a machine for treating leather, a supporting structure, an endless conveyer mounted thereon and provided with openings, a plurality of spaced rolls arranged beneath the upper portion of the endless conveyer and carrying pins adapted to extend through and beyond the openings of the endless conveyer, and a plurality of rotatable brushes arranged near and above the endless conveyer.

9. In a machine for treating leather, a supporting structure, an endless conveyer mounted thereon and provided with openings, a plurality of rolls arranged beneath the upper portion of the endless conveyer and having prongs adapted to extend through and beyond the openings in the endless conveyer, a plurality of plain rolls arranged beneath the upper portion of the endless conveyer to contact therewith and disposed in alternate relation with respect thereto, and a plurality of rotatable brushes arranged near the upper side of the endless conveyer and directly above the plain rolls.

10. In a machine for treating leather, a supporting structure, a trough, an endless conveyer connected with the supporting structure and having its upper portion traveling through the trough, a plurality of rolls arranged within the trough beneath the upper portion of the endless conveyer and provided with prongs adapted to extend through and beyond the openings in the endless conveyer, and a plurality of rotatable brushes arranged above and near the endless conveyer.

11. In a machine for treating leather, a supporting structure, a traveling support connected therewith, a plurality of spaced rotatable brushes arranged near and above the traveling support, and a guard arranged between the lower portions of the rotatable brushes and the traveling support to prevent the material carried by the traveling support passing upwardly between the brushes.

12. In a machine for treating leather, a supporting structure, a traveling support connected therewith, a plurality of spaced rotatable brushes arranged near and above the traveling support, a guard arranged between the lower portions of the rotatable brushes and the traveling support to prevent the material carried by the traveling support passing upwardly between the brushes, and means to vertically adjust the guard with respect to the traveling support.

13. In a machine for treating leather, a supporting structure, a traveling support connected therewith, a plurality of spaced rotatable brushes arranged near and above the traveling support, a guard arranged between the lower portions of the rotatable brushes and the traveling support to prevent material carried by the traveling support passing upwardly between the brushes, and yielding means to move the guard toward the traveling support.

14. In a machine for treating leather, a supporting structure, a traveling support connected therewith, a plurality of spaced rotatable brushes arranged near and above the traveling support, a roll arranged between the lower portions of the rotatable brushes and traveling supports, and guard members disposed near and upon opposite sides of the roll.

15. In a machine for treating leather, a supporting structure, a traveling support connected therewith, a plurality of spaced rotatable brushes arranged near and above the traveling support, a pair of vertically adjustable carriages arranged near and above the traveling support between the lower portions of the brushes, a roll carried by the carriages, and guard members secured to the carriages and disposed upon opposite sides of the roll.

16. In a machine for treating leather, a supporting structure, a traveling support, a plurality of rotatable brushes arranged near and above the traveling support, a pair of vertically adjustable carriages arranged near and above the traveling support between the lower portions of the brushes, guard means connected with the carriages, upstanding tubes secured to the carriages, rods provided with heads and extending through the tubes and adapted to have the tubes partake of slight longitudinal movement with relation thereto, fixed supports with which the rods have screw-threaded engagement, spring means arranged between the rods and the tubes, and means to turn the rods.

In testimony whereof I affix my signature in presence of two witnesses.

CARLETON RUHE.

Witnesses:
  NERO O. JESSUP,
  W. W. WARING.

Copies of this patent may be obtained for five cents each, by addressing the "Commissioner of Patents, Washington, D. C."